Nov. 20, 1962 L. C. ZIEGLER 3,064,858
DEVICE FOR DISPENSING SMALL MEASURED QUANTITIES OF A MEDIUM
Filed April 1, 1960
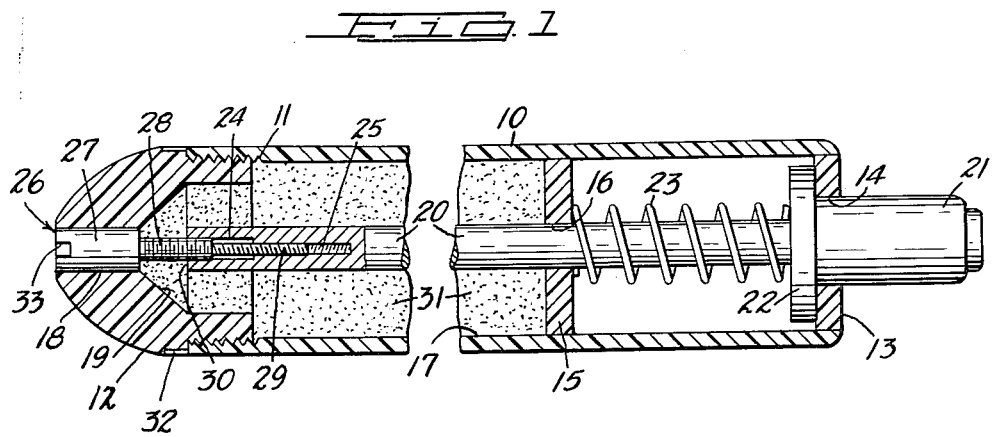
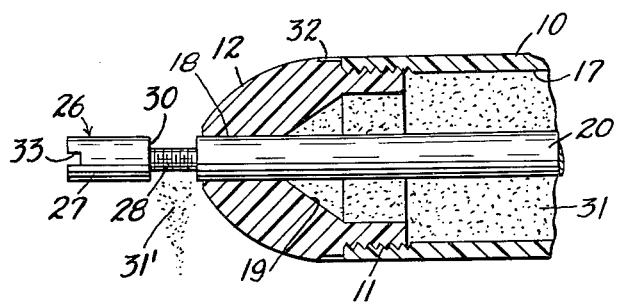
INVENTOR.
LOUIS C. ZIEGLER
BY
Howard E. Thompson
ATTORNEY 3,064,858
DEVICE FOR DISPENSING SMALL MEASURED QUANTITIES OF A MEDIUM
Louis C. Ziegler, 5 Skyland Drive, Englewood Cliffs, N.J.
Filed Apr. 1, 1960, Ser. No. 19,300
2 Claims. (Cl. 222—49)

This invention relates to dispensing devices in the form of an elongated more or less pencil-like structure, having a storage chamber therein for storing predetermined fluid or solid mediums to be dispensed in predetermined measured quantities from one end of the device. More particularly, the invention deals with a device of the character described, wherein an adjustable element is employed for gauging or measuring the desired amount of the medium to be dispensed in each operation of the device.

The novel features of the invention will be best understood from the following description, when taken together with the accompanying drawing, in which certain embodiments of the invention are disclosed and, in which, the separate parts are designated by suitable reference characters in each of the views and, in which:

FIG. 1 is an enlarged sectional view through a device made according to my invention, parts of the construction being broken away and parts shown in elevation, the device being illustrated in its normal inoperative position; and FIG. 2 is a view, similar to FIG. 1, showing one end portion only of the device and diagrammatically illustrating the method of dispensing the medium from the device.

My invention deals with an elongated more or less pencil-type of device of simple and economical construction adapted to store in the chamber of the device powders, grains, crystals or liquids of any type and kind which may be used for medicinal purposes, as a food or feed ingredient, including chemicals or any other type of medium utilized in domestic as well as commercial fields.

In the drawing, I have shown one adaptation and use of the invention, which comprises an elongated casing 10, internally threaded at one end, as seen at 11, for reception of a detachable cap 12. The other end of the casing includes an outer end wall 13 which is shown as a disc-like member sealed in any desired manner in said end of the casing, the disc having an aperture 14. Inwardly of the end 13, the casing includes a supplemental end wall 15 suitably fixed therein and having an aperture 16 centrally thereof. The wall 15 forms between it and the cap 12 a chamber 17 in which the medium to be dispensed is adapted to be stored.

The cap 12 has, centrally of its contracted end, a bore or aperture 18 which opens into a flared bore 19 defining the end of the chamber 17 when the cap 12 is mounted in position. At 20 is shown an elongated plunger rod freely, but snugly, movable in the aperture 16 of the wall 15. Fixed to the outer end of the plunger 20 is a button 21 which operates in the aperture 14 and normally projects beyond the end wall 13.

Outward movement of the button 21 is checked by a flange 22 seating on the inner surface of the wall 13. A spring 23 is mounted on the rod 20 and seats on the wall 15 and the flange 22 in normally supporting the button 21 in its extended position.

The other end of the plunger or rod 20 has a large diameter bore 24 and an inner reduced threaded bore 25, as clearly seen in FIG. 1 of the drawing. At 26 is shown an adjustable plug or gauge element, the plug part 27 of which normally forms a closure for the bore 18, as shown in FIG. 1. The element 26 also includes a reduced shank portion 28, preferably having scale marks thereon, as diagrammatically illustrated, and extending from 28 is a reduced threaded rod 29 operatively engaging the threaded bore 25 to adjust the position of the plug 27 with respect to the end of the plunger 20 to define between these parts what can be termed the measuring or gauging chamber 30 of the device.

It will be noted that the diameter of the plunger 20 is common to the diameter of the plug 27 and both fit snugly, but freely, in the bore 18, so that, when the button is actuated by hand against the action of the spring 23, the medium 31 of the chamber 17 which is positioned in the gauging chamber 30 will be advanced through the bore 18 and then discharged beyond the end of the cap, as is diagrammatically illustrated at 31' in FIG. 2 of the drawing. Upon release of manual pressure on the button 21, the parts will automatically return to the position shown in FIG. 1 and will then be in position for another successive use.

While the various parts of the device can be made of any suitable materials, from the standpoint of economy and lightness, I have illustrated in the present drawings the casing 10, cap 12 and walls 13 and 15, as composed of plastics and the button 21 could also be composed of this material. However, with certain types and kinds of mediums being dispensed, other materials may be found desirable. It will, thus, be apparent that the illustration of plastics is by no means a limitation. In the drawing, the inner end of the large diameter portion of the cap 12 is preferably knurled, as diagrammatically illustrated at 32 to facilitate attachment and detachment of the cap, particularly in replenishing the supply of the medium to the chamber 17 of the device.

By way of illustrating one practical use, let us assume that the medium 31 is a powder or crystal saccharine. For many years, saccharine tablets have ben made up in various grains for individuals in sweetening liquids or food products of any type or kind. In many instances, the measured amounts in these grains do not satisfy the taste of the individual. However, by adjustment of the element 26, for example, by placing any thin member in the screwdriver slot 33 at the outer end of the element 26, the element can be adjusted to gauge the size of the chamber 30 and, thus, give to the user of the device the exact amount of the medium required to satisfy the sweetness desired. By utilizing the powder or crystal form, it will also be apaprent that a quicker mixing or blending of the saccharine with the liquid or food is accomplished. In more technical and commercial uses of the device, the scale marks on the shank portion 28 can be extremely fine to provide accurate dispensing of the medium in the chamber 17 of the device.

The position and method of dispensing the device, as illustrated in FIG. 2 of the drawing, would not necessarily be the most conventional manner of utilizing the pencil-type of device. In most instances, the device would be held in vertical position and the medium would be dipsensed circumferentially around the plug 27. It will, thus, appear that the medium will be spread and distributed over a reasonably large area of the receptacle, into which the medium is discharged. For example, with saccharine, the powder or crystals will be distributed over the fluid in a cup of coffee or over cereal or other foods that are to be sweetened.

This method of procedure also enables the medium to be quickly mixed or combined with the products, in connection with which the medium is used.

Having fully described my invention, what I claim as new and desire to secure by Letters Patent is:

1. A dispensing device of the character described, comprising an elongated tubular casing, means forming a chamber extending longitudinally of the casing and opening through an elongated bore at one end of the device, a plunger slidably mounted in the casing, means at one end of the plunger exposed through the casing for actuating said plunger, an element having an elongated plug spaced with respect to the other end of said plunger, said plug being slidable in and normally closing said bore, the plug being of one diameter throughout its length and fitting snugly in and extending the full length of and closing said bore, the spacing of the plug of said element with respect to the second named end of the plunger forming a chamber gauging the amount of a medium contained in the casing for discharge therefrom through said bore, the plunger being of the same diameter as said plug and said bore, the stroke of said plunger being such as to extend the second named end of the plunger the full length of said bore to insure complete discharge of all of the measured medium from the bore of the device, and said element including a threaded rod operating in a threaded bore in the plunger to control the size of the chamber between said plug and the second named end of the plunger.

2. A device as defined in claim 1, wherein said element includes a scaled shank portion of larger diameter than said threaded rod and extending between the plug and said threaded rod, and said shank portion operating in connection with the second named end of said plunger in gauging the volume of the medium dispensed from the device.

References Cited in the file of this patent
UNITED STATES PATENTS

| | | |
|---|---|---|
| 427,165 | Fickett | May 6, 1890 |
| 576,241 | Van Ame | Feb. 2, 1897 |
| 1,993,401 | Dudley | Mar. 5, 1935 |
| 2,122,216 | Seawell | June 28, 1938 |
| 2,331,549 | Glawon | Oct. 12, 1943 |
| 2,537,415 | Loeb et al. | Jan. 9, 1951 |